United States Patent Office 3,214,467
Patented Oct. 26, 1965

3,214,467
SULFONYL UREA COMPOUNDS AND A PROCESS OF MAKING SAME
Erich Haack, Heidelberg, Wilhelm Peschke and Ruth Heerdt, Mannheim, and Walter Aumueller and Gerhard Korger, Frankfurt am Main, Germany, assignors to C. F. Boehringer & Soehne G.m.b.H., Mannheim-Waldhof, Germany, a corporation of Germany
No Drawing. Filed Dec. 14, 1960, Ser. No. 75,687
Claims priority, application Germany, Feb. 26, 1957, B 43,672
3 Claims. (Cl. 260—553)

The present application is a continuation-in-part of copending application Serial No. 716,021, filed February 19, 1958, now abandoned.

The present invention relates to orally effective compounds for treating diabetes and more particularly to orally effective antidiabetic sulfonyl urea compounds, to a process of making same, and to a method of treating diabetes therewith.

At present, the treatment of human diabetes consists in dietary restriction and parenteral administration of insulin. During the last decade many attempts have been made to replace insulin by an orally effective antidiabetic agent. All these attempts, however, have failed, either because of the unreliable activity of such agents or because of the toxic side-effects encountered on their administration. For instance, diguanidine compounds with a high molecular alkylene residue which have been orally administered as antidiabetic agents, have been found to be rather toxic and, therefore, unsatisfactory. Other compounds which exhibit oral antidiabetic activity such as the glucokinins have proved to be quite unreliable in their blood sugar lowering effects. A number of other compounds have shown some oral antidiabetic activity in animal experiments. They are, however, rather toxic and, therefore, have not been clinically tested in view of their disagreeable side-effects. Compounds of this type are heterocyclic derivatives of sulfanilamides and more particularly sulfanilamido thiodiazoles substituted by an ethyl, isopropyl, or butyl radical.

None of the known blood sugar lowering compounds meets the requirements of a clinically useful, orally effective antidiabetic agent. Such an agent must combine low toxicity especially with regard to liver, adrenal glands, and central nervous system, with highly reliable antidiabetic action. Furthermore, such an agent must not exert a sustained antidiabetic effect at a persistently satisfactory level so that dangerous hypoglycemic conditions are avoided.

Recently it was found that certain sulfonyl urea compounds meet the requirements mentioned hereinabove to a considerable extent.

While the sulfanilamido thiodiazole compounds have only been tested on animals and have not been used in human therapy and while all the other known sulfanilamides do not exhibit any appreciable antidiabetic activity, said sulfonyl urea compounds produce a reliable and uniform action on the human carbohydrate metabolism and are substantially free of toxic side-effects. Such compounds especially are derivatives of sulfanilyl urea or, respectively, benzene sulfonyl ureas which contain alkyl radicals or halogen in the benzene ring. However, these known compounds are of relatively low activity and/or are rather rapidly and readily excreted from the body so that repeated administration is required.

It is one object of the present invention to provide orally effective antidiabetic sulfonyl urea compounds which meet all the above mentioned requirements, which are substantially non-toxic and substantially free of obnoxious side-effects, which are well compatible, and which remain in the human body during a sufficiently prolonged period of time.

Another object of the present invention is to provide simple and effective processes of producing such new and valuable orally effective antidiabetic compounds.

A further object of the present invention is to provide a method of treating diabetes by orally administering to diabetic patients such orally effective antidiabetic compounds in predetermined dosages taken at predetermined periods of time.

Other objects of the present invention and advantageous features thereof will become apparent as the description proceeds.

In principle, the new orally effective antidiabetic compounds according to the present invention are characterized by the additional introduction of an amino group into the benzene ring of the known alkyl substituted benzene sulfonyl ureas. It was found that the period of time such compounds remain in the human body is considerably increased when comparing them with the same compounds without an amino group. Many of these new compounds exhibit an increased blood sugar lowering efficiency when comparing them with sulfanilyl ureas which have no additional substituent in the benzene ring. As such substituted sulfonamides of the urea series are well tolerated, a new class of valuable orally effective antidiabetic compounds is supplied to the medical profession by the present invention. The new compounds are especially advantageous because of the low dosage required for treating diabetes which is a result of their high blood sugar-lowering efficiency and the increased period of time they remain in the human body.

The new antidiabetic compounds according to the present invention are benzene sulfonyl urea compounds of Formula I:

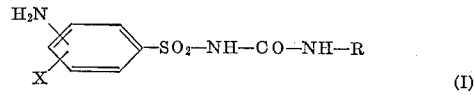

(I)

and their salts with alkali metals, alkaline earth metals, ammonium, and organic amines.

In said formula

X represents a lower alkyl radical, and especially the methyl radical, while
R represents an aliphatic or cycloaliphatic hydrocarbon radical containing between 3 and 10 carbon atoms; the chain of carbon atoms of said aliphatic or cycloaliphatic hydrocarbon radicals may be interrupted by the heteroatoms oxygen or sulfur.

Sulfonyl urea compounds according to the above given Formula I are produced, for instance, according to methods as they are ordinarily employed in the synthesis of substituted urea compounds. However, the simplest method, namely reaction of a suitable benzene sulfonyl chloride with a correspondingly substituted urea compound does not yield satisfactory results and has the disadvantage that the yield of the new benzene sulfonyl urea compounds is quite low and that a considerable number and amount of by-products is formed. The reason for the low yield is that the sulfonyl group not only combines with the nitrogen atom of the urea compound but that it also and preferably combines with its oxygen atom thereby yielding an isourea compound. The resulting isourea compound splits off sulfonic acid and forms the corresponding substituted cyanamide.

According to the present invention the new compounds are preferably prepared, for instance, by reacting a suitable benzene sulfonamide, preferably in the form of its sodium or potassium salt, with an ester of isocyanic acid according to the following Equation A:

(A)

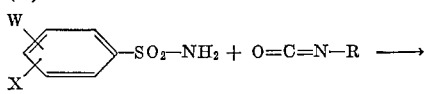

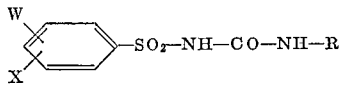

wherein

W represents an amino group or a group which can be converted into an amino group; while X and R represent the same substituents as indicated hereinabove for the compound of Formula I.

In place of the isocyanate, compounds may be used as starting materials which are readily convertible under the reaction conditions, for instance, by heating into isocyanic acid esters; such compounds are, for instance, suitably substituted carbamic acid halogenides, urethanes, $N_2$-substituted urea compounds, and their $N_1$-acylated derivatives which, preferably, contain a lower aliphatic acyl group, such as the acetyl, propionyl, and butyroyl group, or the benzoyl group.

By reversing the above mentioned reaction A and first producing the corresponding benzene sulfonyl isocyanate compound from a suitable derivative of a phenyl sulfonamide, the same benzene sulfonyl urea compound is obtained by reacting said isocyanate compound with a suitable amino compound according to the following Equation B:

(B)

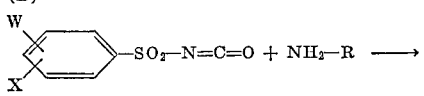

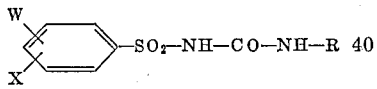

Compounds which are readily convertible into such sulfonyl isocyanate compounds under the reaction conditions and which may be used in place of the sulfonyl isocyanates, are, for instance, sulfonyl urethanes, sulfonyl thiourethanes, sulfonyl carbamic acid halogenides, sulfonyl urea compounds, and their $N_2$-acylated derivatives. Of the last group of compounds the preferred compounds are the disulfonyl urea compounds and such $N_1$-substituted substituted sulfonyl urea compounds which contain a lower aliphatic acyl group at the $N_2$-atom, such as the acetyl, propionyl, and butyroyl group, or the benzoyl group.

The above mentioned methods, however, are not the only methods which yield the desired compounds. For instance, a substituted isourea alkyl ether can be reacted with a benzene sulfonic acid chloride substituted by the groups W and X and the resulting benzene sulfonyl isourea compound is then split up by treatment with a hydrogen halide of the formula HHal to an alkyl halogenide and the desired sulfonyl urea compound according to the following Equation C:

(C)

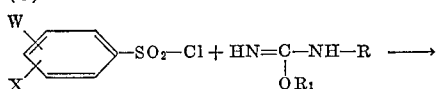

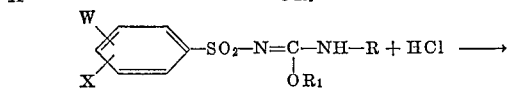 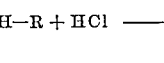

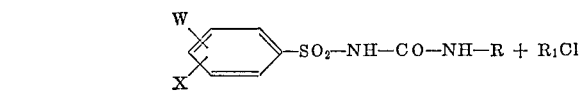

In said formulas $R_1$ preferably indicates a lower alkyl radical.

Other derivatives of carbonic acid can also be used as starting materials. An undesired group present in such starting materials can be replaced by the oxygen atom, for instance, by hydrolysis or can be converted into oxygen by other methods, for instance, by oxidation. Thus, for instance, a guanidine derivative can be converted by alkaline hydrolysis into the corresponding urea compound, or a thiourea compound can be oxidized, for instance, with nitrous acid to the desired benzene sulfonyl urea compound. The following Equations D and E illustrate such methods of producing the new and valuable phenyl sulfonyl urea compounds according to the present invention:

(D)

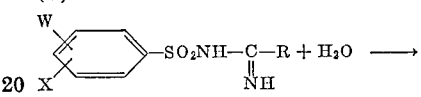

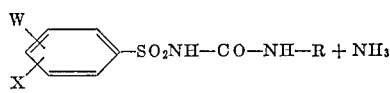

Conversion of the thiourea compound (the reaction, most probably, proceeds as indicated).

(E)

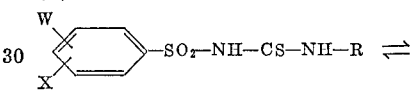

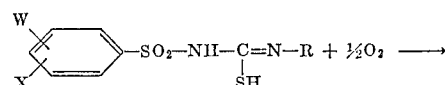

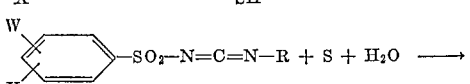

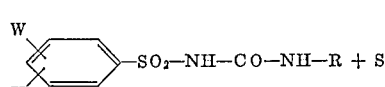

In many of the above mentioned reactions it is necessary or, respectively, advantageous to intermediately protect the amino group attached to the aromatic nucleus, for instance, by acylation and to subsequently split off the acyl group. Such protection may also be effected by using compounds as starting materials which contain a nitro group in the aromatic nucleus in place of the amino group. After conversion into the urea compound has been completed the nitro group is reduced to form the amino group.

The following examples serve to illustrate preferred methods of producing the new sulfonyl urea compound without, however, limiting the same thereto.

EXAMPLE 1

$N_1$-(3-methyl sulfanilyl)-$N_2$-(n-butyl)urea 45.6 g. of N-acetyl-3-methyl sulfanilamide melting at 195–196° C. are dissolved in a mixture of 90 cc. of water, 45 cc. of pyridine, and 100 cc. of 2 N sodium hydroxide solution. A mixture of 30 g. of n-butyl isocyanate and 40 cc. of pyridine is added drop by drop to this solution at about 20° C. within 25 minutes while stirring. Stirring is continued for 15 more minutes. The resulting reaction mixture is evaporated to dryness in a vacuum. The residue is dissolved in 190 cc. of water by adding 14 cc. of 2 N sodium hydroxide solution. The pH-value of the resulting solution is adjusted to a pH of 8.8 by passing gaseous carbon dioxide thereinto. The precipitated starting material is removed by filtration. The filtrate is acidified with dilute hydrochlaric acid and the precipitated crystals of $N_1$-(N-acetyl-3-methyl sulfanilyl)-$N_2$-(n-butyl)urea are filtered off. After drying, the yield is 85% of the theoretical yield. The compound melts at 173–175° C.

To convert the resulting acetylamino compound into the free amino compound, it is heated with 75 cc. of 5 N potassium hydroxide solution at 90° C. for one hour. After cooling to about 50° C., the solution is acidified to a pH of 4.5 by the addition of dilute hydrochloric acid. The resulting crystals are filtered off by suction and are purified by recrystallization from ethanol. The pure compound melts at 130–131° C.

EXAMPLE 2

$N_1$-(4-methyl-3-amino benzene sulfonyl)-$N_2$-(n-butyl)urea

*Method A.*—45.6 g. of 3-acetyl amino-p-toluene sulfonic acid amide melting at 228° C. are caused to react with n-butyl isocyanate under the same reaction conditions and quantitative proportions as described in Example 5. The yield of $N_1$-(3-acetyl amino-p-toluene sulfonyl)-$N_2$-(n-butyl)urea which melts at 156–158° C. is 76%. Saponification of said acetyl amino compound is also carried out as described in Example 5. The free amino compound is recrystallized from methanol. The resulting $N_1$-(3-amino-4-methyl benzene sulfonyl)-$N_2$-(n-butyl) urea has a melting point of 116° C.

*Method B.*—77 g. of 3-nitro-4-methyl benzene sulfonic acid amide are suspended in 120 cc. of acetone. 240 cc. of an aqueous sodium hydroxide solution are added thereto. The resulting clear solution is cooled to 10° C. 36 g. of n-butyl isocyanate are added thereto slowly and while stirring. Stirring is continued at room temperature for one hour. Small amounts of precipitated material are filtered off. The filtrate is acidified by the addition of dilute acetic acid. The precipitated $N_1$-(3-nitro-4-methyl benzene sulfonyl)-$N_2$-(n-butyl)urea is filtered off by suction and is washed with water. After recrystallization from ethanol, the urea compound melts at 149–151° C. The yield is about 70 g.

70 g. of the resulting sulfonyl urea compound are dissolved in 500 cc. of methanol and reduced at 50° C. by means of hydrogen introduced under a pressure of 100 atmospheres gauge in the presence of Raney-nickel catalyst. After cooling, the catalyst is removed from the solution by filtration. The filtrate is concentrated in a vacuum and in a nitrogen atmosphere. The resulting crystalline residue of $N_1$-(3-amino-4-methyl benzene sulfonyl)-$N_2$-(n-butyl)urea is purified by recrystallization from dilute ethanol. The compound melts at 117° C. The yield amounts to 55 g.

EXAMPLE 3

$N_1$-(3-amino-p-toluene sulfonyl)-$N_2$-($\gamma$-methoxy propyl)urea 39 g. of chloro formic acid ethyl ester are added drop by drop to a mixture of 68.4 g. of 3-acetyl amino-p-toluene sulfonic acid amide, 123 g. of potassium carbonate, and 450 cc. of acetone for one hour while boiling under reflux. Refluxing is then continued for nine more hours. The reaction mixture is cooled and mixed, while stirring, with a mixture of 450 cc. of water and 50 cc. of 2 N potassium hydroxide solution. Thereby two layers are formed. The upper layer, which consists of aqueous acetone, is separated. Acetone is distilled off in a vacuum. The pH-value of the resulting aqueous solution is adjusted to a pH of 8.8 by passing gaseous carbon dioxide thereinto. Precipitated unchanged starting material is filtered off. The filtrate is rendered congo acid by the addition of dilute hydrochloric acid. The precipitated 3-acetyl amino-p-toluene sulfonyl ethyl urethane is filtered off by suction, washed with water, and dried in a vacuum. The yield is 77% of the theoretical yield. The resulting compound melts at 183–184° C.

42 g. of said compound are suspended in 29 cc. of dimethyl formamide. 17 g. of $\gamma$-methoxy propylamine are added thereto. Thereby the urethane compounds are dissolved with the evolution of heat. The resulting solution is heated at 70° C. for 1½ hours and, subsequently, for 1½ hours at 110° C. After cooling, the reaction solution is diluted by the addition of 200 cc. of water and is saturated with sodium chloride. Thereby, an oil precipitates which crystallizes after a short period of time. The crystals are filtered off by suction, washed with water, and dried in a vacuum. The yield of 3-acetamino-p-toluene sulfonyl-$\gamma$-methoxy propyl urea melting at 122° C., to 86% of the theoretical yield.

To convert the acetylamino compound into the free amino compound, 40 g. of said acetyl amino compound are heated to 90° C. with 71 cc. of 5 N potassium hydroxide solution for ½ hour. After cooling to about 50° C., the reaction mixture is acidified to a pH of 4.5 by the addition of dilute hydrochloric acid. The precipitated 3-amino-p-toluene sulfonyl-$\gamma$-methoxy propyl urea is filtered off by suction, washed, and dried. The yield is 31 g. The compound melts at 108–109° C.

EXAMPLE 4

$N_1$-(3-methyl sulfanilyl)-$N_2$-($\gamma$-methoxy propyl)urea 78 g. of chloroformic acid ethyl ester are added to a mixture of 113.5 g. of N-acetyl-3-methyl sulfanilamide melting at 196° C., 210 g. of potassium carbonate, and 735 cc. of acetone within about 45 minutes while heating under reflux. Refluxing is continued for 7 hours while stirring. After cooling, the reaction mixture is diluted by the addition of 600 cc. of water. Thereby, two layers are formed. The upper layer which contains water and acetone is separated and the acetone is distilled off in a vacuum. The pH-value of the remaining aqueous solution is adjusted to a pH of 8.8 by passing gaseous carbon dioxide thereinto. Precipitated unchanged starting material is filtered off and the filtrate is acidified to a pH of 2.0 by the addition of dilute hydrochloric acid. The precipitated crystals of 4-acetyl-amino-m-toluene sulfonyl ethyl urethane are filtered off by suction, washed with water, and dried in a vacuum. The yield is 84% of the theoretical yield. The compound melts at 188° C.

56 g. of the urethane compound are suspended in 38 cc. of dimethyl formamide. 22.6 g. of 3-methoxy propylamine are added thereto. The resulting clear solution is heated to 70° C. for 1½ hours and to 110° C. for another 1½ hours. After cooling, 300 cc. of a saturated sodium chloride solution are added thereto. The precipitated oil crystallizes after standing for a short period of time. The crystals are filtered off by suction, washed with water, and dried in a vacuum. The yield of 4-acetylamino-m-toluene sulfonyl-$\gamma$-methoxy propyl urea melting at 151° C. is 75% of the theoretical yield. To convert the acetyl-amino compound into the free amino compound, said acetylamino compound is heated in 83 cc. of 5 N potassium hydroxide solution at 90° C. for one hour. The reaction mixture is cooled to 50° C. and acidified to a pH of 4.5 by the addition of dilute hydrochloric acid. In this manner 4-amino-m-toluene sulfonyl-$\gamma$-methoxy propyl urea which melts at 122° C. is obtained. The yield is 81% of the theoretical yield.

EXAMPLE 5

$N_1$-(3-amino-p-toluene sulfonyl)-$N_2$-($\gamma$-methoxy butyl)urea

*Method A.*—100 g. of 3-acetylamino-p-toluene sulfonyl ethyl urethane obtained by following the procedure described in Example 3, are suspended in 66 cc. of dimethyl formamide. 35 g. of 3-methoxy butylamine are added to the suspension. The resulting clear solution is heated at 70° C. for 1½ hours and at 110° C. for 1½ hours. After cooling, 500 cc. of a saturated sodium chloride solution are added. Thereby, 3-acetamino-p-toluene sulfonyl- γ-methoxy butyl urea is precipitated in the form of a viscous oil.

This compound is saponified without further purification by dissolving it in 200 cc. of 5 N potassium hydroxide solution and heating the solution to 90° C. for one hour. After cooling, the reaction mixture is diluted by the addition of 200 cc. of water. Dilute hydrochloric acid is added drop by drop while stirring until the pH-value of the mixture is adjusted to a pH of 6.5. The solution is decanted from small amounts of precipitated oil and its pH-value is adjusted to a pH of 4.5. 3-amino-p-toluene sulfonyl-γ-methoxy butyl urea precipitates in the form of crystals. The yield is 72% of the theoretical yield. The melting point is 105–106° C.

*Method B.*—216 g. of 3-nitro-p-toluene sulfonic acid amide are dissolved in 1.5 l. of acetone. After the addition of 410 g. of potassium carbonate, 130 g. of chloroformic acid ethyl ester are added drop by drop to the solution within about 30 minutes while boiling under reflux. Thereafter, refluxing is continued for 7 more hours while stirring. After cooling, the reaction mixture is mixed and stirred with 1.3 l. of water. Thereby, two layers are formed. The upper layer, which consists of water and acetone, is separated. The acetone is distilled off in a vacuum. Thereby, precipitation of a crystalline reaction product, the potassium salt of the desired urethane compound, takes place. The salt is again dissolved by addition of 500 cc. of water. The solution is acidified to a pH of 2.0 by the dropwise addition of dilute hydrochloric acid while stirring. The crystalline precipitate 3-nitro-p-toluene sulfonyl ethyl urethane is filtered off by suction, washed with water, and dried in a vacuum. The yield is 98% of the theoretical yield. The compound melts at 125–126° C.

86.4 g. of the obtained nitro compound are dissolved in a mixture of 60 cc. of dimethyl formamide and 31 g. of γ-methoxy butylamine. The solution is heated at 110° C. for three hours. After cooling to about 50° C., the reaction mixture is poured into one liter of water. The precipitated oil crystallizes after a short period of time. The crystals are filtered off by suction, washed with water, and dried in a vacuum. 3-nitro-p-toluene sulfonyl-γ-methoxy butyl urea having a melting point of 112° C. is obtained in a yield of 69% of the theoretical yield.

In order to reduce the nitro group of the resulting nitro compound, 35 g. thereof are dissolved in 200 cc. of concentrated ammonium hydroxide solution. Gaseous hydrogen sulfide is introduced into the solution at 70° C. within about 2½ hours while stirring. The resulting solution is concentrated by evaporation in a vacuum to two thirds of its original volume. After addition of 100 cc. of 2 N hydrochloric acid, the precipitated sulfur is filtered off. The pH-value of the solution is then adjusted to a pH of 4.8 by cautious addition of 2 N sodium hydroxide solution. The precipitated crystals of 3-amino-p-toluene sulfonyl-γ-methoxy butyl urea are filtered off by suction, washed with water, and dried in a vacuum. The yield is 85% of the theoretical yield. The melting point is 105–106° C.

EXAMPLE 6

$N_1$-(*3-amino-p-toluene sulfonyl*)-$N_2$-*cyclohexyl urea*

54 g. of 3-acetylamino-p-toluene sulfonyl ethyl urethane prepared by following the procedure described in Example 3, are mixed with 37 cc. of dimethyl formamide and 18 g. of cyclohexylamine. The resulting clear solution is heated at 70° C. for 1½ hours and at 110° C. for 1½ more hours. After cooling, the reaction mixture is poured into 500 cc. of water while stirring. The precipitated oily product crystallizes after a short while. The crystals are filtered off by suction, washed with water, and dried in a vacuum. 84% of the theoretical yield of 3-acetylamino-p-toluene sulfonyl cyclohexyl urea are obtained. The compound melts at 174° C.

The urea compound is saponified without further purification by heating it in 90 cc. of 5 N potassium hydroxide solution at 90° C. for one hour. After dilution with 500 cc. of water the resulting reaction mixture is rendered acid (pH 6.5) by the addition of dilute hydrochloric acid. Thereby, 3-amino-p-toluene sulfonyl cyclohexyl urea separates in crystals which are collected, washed with water, and dried. The yield is 86% of the theoretical yield. After recrystallization from ethanol the compound melts at 151–152° C.

EXAMPLE 7

$N_1$-(*3-amino-2-methyl benzene sulfonyl*)-$N_2$-*3-methoxy propyl urea*

Equimolecular amounts of 3-nitro-o-toluene sulfonyl ethyl urethane (M.P. 118–120° C.; prepared from 3-nitro-o-toluene sulfonic acid amide by an analogous method as described in Example 5B) and of 3-methoxy propylamine are dissolved in dimethyl formamide. The solution is heated at 110° C. for three hours. The resulting reaction mixture is worked up as described in Example 5. $N_1$-(3-nitro-o-toluene sulfonyl)-$N_2$-(3-methoxy propyl) urea having a melting point of 122–124° C. is obtained in a yield of 73% of the theoretical yield.

The reduction of the nitro group in 3-position is carried out in an analogous manner as described in Example 5B. $N_1$-(3-amino-o-toluene sulfonyl)-$N_2$-(3-methoxy propyl) urea having a melting point of 151–153° C. is obtained in a yield of 66% of the theoretical yield.

EXAMPLE 8

$N_1$-(*3-amino-2-methyl benzene sulfonyl*)-$N_2$-*(3-methoxy butyl)urea*

By using the same amount of 3-methoxy butylamine, in place of 3-methoxy propylamine, and proceeding otherwise in the same manner as described hereinabove in Example 7, $N_1$-(3-amino-o-toluene sulfonyl)-$N_2$(3-methoxy butyl)urea having a melting point of 116–118° C. is produced. The corresponding intermediate 3-nitro compound melts at 123–125° C.

EXAMPLE 9

$N_1$-(*3-amino-2-methyl benzene sulfonyl*)-$N_2$-*cyclohexyl urea*

By using the same amount of cyclohexyl amine, in place of 3-methoxy propylamine, and proceeding otherwise in the same manner as described hereinabove in Example 7, $N_1$-(3-amino-o-toluene sulfonyl)-$N_2$-cyclohexyl urea having a melting point of 170° C. is produced. In this case the corresponding 3-nitro compound (M.P. 157–158° C.), preferably, is converted into the 3-amino compound by catalytical reduction using dimethyl formamide as solvent, palladium precipitated on barium sulfate as catalyst, and operating at room temperature; yield: 71%.

EXAMPLE 10

$N_1$-(*3-amino-p-toluene sulfonyl*)-$N_2$-*(2-pentyl)urea*

3-nitro-p-toluene sulfonyl ethyl urethane and 2-pentyl amine are dissolved in dimethyl formamide and heated in an analogous manner as described in Example 5B. $N_1$-(3-nitro-p-toluene sulfonyl)-$N_2$-(2-pentyl)urea having a melting point of 140–141° C. is produced in a yield of about 65% of the theoretical yield. By reduction of this compound with ammonium sulfide $N_1$-(3-amino-p-toluene sulfonyl)-$N_2$-(2-pentyl)urea having a melting point of 111–112° C. is obtained in a yield of about 60% of the theoretical yield.

EXAMPLE 11

$N_1$-(*3-amino-p-toluene sulfonyl*)-$N_2$-*cyclopentyl urea*

By using cyclopentylamine, in place of 2-pentyl amine, and proceeding otherwise in the same manner as described hereinabove in Example 10, $N_1$-(3-amino-p-toluene sulfonyl)-$N_2$-cyclopentyl urea having a melting point of 155–156° C. is produced. The corresponding 3-nitro compound melts at 157–158° C.

EXAMPLE 12

$N_1$-(3-amino-p-toluene sulfonyl)-$N_2$-tetrahydro furfuryl urea

By using tetrahydrofurfurylamine, in place of 2-pentylamine, and proceeding otherwise in the same manner as described hereinabove in Example 10, $N_1$-(3-amino-p-toluene sulfonyl)-$N_2$-tetrahydrofurfuryl urea having a melting point of 140–141° C. is produced. The corresponding 3-nitro compound melts at 122° C.

EXAMPLE 13

$N_1$-(3-amino-4-ethyl benzene sulfonyl)-$N_2$-(n-butyl)urea

Equimolecular amounts of 3-nitro-4-ethyl benzene sulfonyl ethyl urethane (M.P. 137–138° C.; prepared from 3-nitro-4-ethyl benzene sulfonic acid amide by an analogous method as described in Example 5B) and of n-butylamine are dissolved in dimethyl formamide and heated in the same manner as described in Example 5. $N_1$-(3-nitro-4-ethyl benzene sulfonyl)-$N_2$-(n-butyl)urea having a melting point of 130–132° C. is obtained in a yield of 86% of the theoretical yield. By reduction of this compound with ammonium sulfide $N_1$-(3-amino-4-ethyl benzene sulfonyl)-$N_2$-(n-butyl)urea having a melting point of 108–109° C. is obtained in a yield of 75% of the theoretical yield.

EXAMPLE 14

$N_1$-(3-amino-4-ethyl benzene sulfonyl)-$N_2$-cyclohexyl urea

By using the same amount of cyclohexylamine, in place of n-butylamine, and proceeding otherwise in the same manner as described hereinabove in Example 13, $N_1$-(3-amino-4-ethyl benzene sulfonyl)-$N_2$-cyclohexyl urea having a melting point of 136–138° C. is produced. The corresponding 3-nitro compound melts at 137–139° C.

EXAMPLE 15

$N_1$-(3-amino-6-methyl benzolsulfonyl)-$N_2$-(n-butyl)urea 3-acetyl amino-6-methyl benzene sulfonyl ethyl urethane (M.P. 162° C.; prepared by treating the corresponding sulfonic acid amide with chloro formic acid ethyl ester) and butylamine are reacted in the same manner as described in Example 3. After an analogous working up, $N_1$-(3-acetyl amino-6-methyl benzene sulfonyl)-$N_2$-(n-butyl)urea (M.P. 187° C.) is obtained. This product, without further purification, can be converted into the free amino compound (M.P. 153–154° C.) by alkaline saponification (yield: 65% calculated for the urethane used as starting material.

EXAMPLE 16

$N_1$-(2-amino-p-toluene sulfonyl)-$N_2$-cyclohexyl urea 2-acetyl amino-p-toluene sulfonic acid amide (M.P. 174° C.; prepared from the corresponding 2-nitro compound by catalytic reduction and acetylation) is converted into 2-acetyl amino-p-toluene sulfonyl ethyl urethane in an analogous manner as described in Example 3 (M.P. 177–178° C.; yield 75%). Reaction of this compound with cyclohexylamine is performed in an analogous manner as described in Example 3. $N_1$-(2-acetyl amino-p-toluene sulfonyl)-$N_2$-cyclohexyl urea having a melting point of 162° C. is obtained in a yield of 63% of the theoretical yield. Conversion of this acetylamino compound into the free amino compound takes place in the same manner as described in Example 3 (yield 85%). The resulting $N_1$-(2-amino-p-toluene sulfonyl)-$N_2$-cyclohexyl urea melts at 150–151° C., whereby the product is transformed into a cyclic compound (i.e. the cyclohexylamine addition salt of 3-keto-6-methyl-3,4-dihydro benzothiodiazine-1,1-dioxide).

EXAMPLE 17

$N_1$-(3-methyl sulfanilyl)-$N_2$-(n-butyl)urea 10 g. of $N_1$-(N-acetyl-3-methyl sulfanilyl)-$N_2$-butyl guanidine, prepared by reacting N-acetyl-3-methyl sulfanilyl chloride with n-butyl guanidine, and 20 cc. of 10 N potassium hydroxide solution are heated to 90° C. for 2 hours. The resulting solution is diluted by the addition of 100 cc. of water. The pH-value of the solution is then adjusted to a pH of 8 by cautious addition of dilute hydrochloric acid. The precipitated crystals of $N_1$-(3-methyl sulfanilyl)-$N_2$-butyl guanidine are filtered off by suction. The filtrate is acidified by addition of dilute hydrochloric acid. The precipitated $N_1$-(3-methyl sulfanilyl)-$N_2$-(n-butyl)urea melts at 130–131° C.

EXAMPLE 18

$N_1$-(3-amino-p-toluene sulfonyl)-$N_2$-(3-methyl mercapto-n-propyl)urea 3-acetyl amino-p-toluene sulfonic acid amide is converted into the corresponding ethyl urethane by the method described in Example 3. Said urethane is treated with 3-methyl mercapto-n-propyl amine in an analogous manner as described in Example 3. $N_1$-(3-acetyl amino-p-toluene sulfonyl)-$N_2$-(3-methyl mercapto-n-propyl)urea having a melting point of 209–210° C. is obtained. This acetylamino compound can be converted into the free amino compound by alkaline saponification. $N_1$-(3-amino-p-toluene sulfonyl)-$N_2$-(3-methyl mercapto-n-propyl)urea having a melting point of 118–120° C. is obtained in a yield of about 60% calculated for the urethane used as starting material.

EXAMPLE 19

$N_1$-(3-amino-4-methyl benzene sulfonyl)-$N_2$-cycloheptyl urea 19 g. of cycloheptyl amine are poured over 45.6 g. of N-(3-nitro-4-methyl benzene sulfonyl)carbamic acid methyl ester which had been prepared by reacting 3-nitro-4-methyl benzene sulfonamide with chloro formic acid methyl ester in acetone solution in the presence of calcium carbonate (melting point: 156–157° C.). Salt formation takes place whereby the temperature of the reaction mixture increases. The mixture is heated to 125–130° C. for 1½ hours. The molten mixture is cooled and treated with about 1% aqueous ammonia. The resulting reaction product, the ammonium salt of $N_1$-(3-nitro-4-methyl benzene sulfonyl)-$N_2$-cyclohexyl urea which partly precipitates, is acidified by the addition of dilute hydrochloric acid. The precipitate is filtered off by suction and $N_1$-(3-nitro-4-methyl benzene sulfonyl)-$N_2$-cycloheptyl urea is obtained in a good yield and is recrystallized from ethanol. This compound melts at 169–170° C.

27 g. of the resulting nitro compound are catalytically reduced in 300 cc. of methanol in the presence of Raney nickel at room temperature and under atmospheric pressure. As soon as the calculated amount of hydrogen has been adsorbed, the catalyst is filtered off and water is added to the methanolic solution, until it starts to become turbid. After standing and seeding, crystals of $N_1$-(3-amino-4-methyl benzene sulfonyl)-$N_2$-cycloheptyl urea are obtained. The yield of the crystalline product is increased by carefully adding further amounts of water. The resulting crystals are filtered off by suction and are dried in a desiccator. The melting point of the compound is 152–154° C. The yield amounts to 20 g.

EXAMPLE 20

$N_1$-(3-amino-4-methyl benzene sulfonyl)-$N_2$-cyclooctyl urea 54.8 g. of N-(3-nitro-4-methyl benzene sulfonyl)carbamic acid methyl ester and 25.4 g. of cyclooctyl amine are reacted in an analogous manner as described in Example 19. Thereby $N_1$-(3-nitro-4-methyl benzene sulfonyl)-$N_2$-cyclooctyl urea of the melting point 162–164° C. is obtained. This nitro compound is converted into $N_1$-(3-amino-4-methyl benzene sulfonyl)-$N_2$-cyclooctyl urea of the melting point 160–162° C. by reduction with hydrogen in the presence of Raney nickel and methanol.

using, in place of cycloheptylamine, cyclooctylamine, propylamine or hexahydrobenzylamine, equimolecular amounts of the amines given in the following table for the reaction with 3-nitro-4-methyl benzene sulfonyl methyl or ethyl urethane:

| Example No. | Amine used | $N_1$-(4-methyl-3-amino benzene sulfonyl) urea compound obtained | Melting point, °C. | Melting point of nitro compound, °C. |
|---|---|---|---|---|
| 23 | 2-methyl cyclohexylamine | -$N_2$-(2-methyl cyclohexyl) urea | 188–190 | 208–209 |
| 24 | 3-methyl cyclohexylamine | -$N_2$-(3-methyl cyclohexyl) urea | 148–149 | 145 |
| 25 | 4-methyl cyclohexylamine | -$N_2$-(4-methyl cyclohexyl) urea | 175–176 | 212 |
| 26 | Bicyclo-[2, 2, 1]-heptyl-2-amine | -$N_2$-(bicyclo-[2, 2, 1]-heptyl-2) urea | 168–170 | 128–130 |
| 27 | Bicyclo-[2, 2, 1]-heptyl-2-methylamine | -$N_2$-(bicyclo-[2, 2, 1]-heptyl-2)-methyl urea | 178–180 | 148–150 |
| 28 | 1, 7, 7-Trimethyl-bicyclo-[2, 2, 1]-heptyl-2-amine | -$N_2$-(1, 7, 7-trimethyl bicyclo-[2, 2, 1]-heptyl-2)-urea | 195–196 | 101–106 |
| 29 | 2, 3, 3-Trimethyl bicyclo-[2, 2, 1]-heptyl-2-amine | -$N_2$-(2, 3, 3-trimethyl bicyclo-[2, 2, 1]-heptyl-2)-ureau. | 174–175 | 176–177 |
| 30 | Cyclobutylamine | -$N_2$-cyclobutyl urea | 146–148 | 163–164 |
| 31 | 9-Decalylamine | -$N_2$-(9-decalyl) urea | 178–180 | 195–196 |
| 32 | $\Delta_2$-Cyclohexenylamine | -$N_2$-($\Delta_2$-cyclohexenyl) urea | 144–145 | 126–128 |
| 33 | $\Delta_2$-Cyclopentenylamine | -$N_2$-($\Delta_2$-cyclopentenyl) urea | 148 | 172 |
| 34 | $\Delta_5$-Bicyclo-[2, 2, 1]-heptenyl-2-methyl-amine | -$N_2$-($\Delta_5$-bicyclo-[2, 2, 1]-heptenyl-(2)-methyl) urea. | 164–165 | 147–148 |
| 34a | $\Delta_5$-Bicyclo-[2, 2, 1]-heptenyl-2-amine | -$N_2$-($\Delta_5$-bicyclo-[2, 2, 1]-heptenyl-2) urea | 171–172 | 146–148 |

EXAMPLE 21

$N_1$-(3-amino-4-methyl benzene sulfonyl)-$N_2$-propyl urea 54.8 g. of N-(3-nirto-4-methyl benzene sulfonyl)carbamic acid methyl ester are mixed with 12 g. of propylamine. The temperature of the mixture increases and the propylamine salt of N-(3-nitro-4-methyl benzene sulfonyl) carbamic acid methyl ester is formed. Said salt is heated to 130–135° C. for 1½ hours. The resulting molten mass is cooled and treated with about 1% aqueous ammonia. The residue is filtered off, the filtrate is acidified by the addition of dilute hydrochloric acid, and the resulting crystalline $N_1$-(3-nitro-4-methyl benzene sulfonyl)-$N_2$-propyl urea is filtered off by suction and recrystallized from ethanol. The compound melts at 161–163° C.

41 g. of said nitro compound are suspended in 350 cc. of methanol. The suspension is shaken with hydrogen at room temperature and in the presence of Raney nickel. After about 9 l. of hydrogen have been adsorbed, the catalyst is filtered off and the $N_1$-(3-amino-4-methyl benzene sulfonyl)-$N_2$-propyl urea is caused to crystallize by slowly adding water to the filtrate. The compound is filtered off by suction and dried. It melts at 117–119° C.

EXAMPLE 22

$N_1$-(4-methyl-3-amino benzene sulfonyl)-$N_2$-hexahydrobenzyl urea 57 g. of 3-nitro-toluene sulfonyl ethyl urethane are heated with 40 cc. of dimethyl formamide and 22 g. of hexahydrobenzylamine to 110° C. for 3 hours. The cooled reaction mixture is added to about 700 cc. of water. The resulting precipitate is filtered off by suction and washed with water. After drying in a vacuum, $N_1$-(3-nitro-p-toluene sulfonyl)-$N_2$-hexahydrobenzyl urea of the melting point 154–156° C. is obtained in a yield of about 70% of the theoretical yield.

In order to reduce the nitro group in 3-position, the compound is dissolved in the calculated amount of N sodium hydroxide solution. The resulting solution is added drop by drop to an aqueous suspension of an excess of ferrous hydroxide at room temperature within 10 minutes while stirring. Stirring of the mixture is continued for about 15 minutes. The ferric hydroxide precipitate is filtered off and the filtrate is acidified by the addition of hydrochloric acid to a pH of 4.0. $N_1$-(4-methyl-3-amino benzene sulfonyl)-$N_2$-hexahydrobenzyl urea is obtained thereby in a yield of about 80% of the theoretical yield. Its melting point is 172–174° C.

The following sulfonyl urea compounds according to the present invention are produced by following the procedure described hereinabove in Examples 19 to 22 and

EXAMPLE 35

$N_1$-(4-isopropyl-3-amino benzene sulfonyl)-$N_2$-butyl urea 60 cc. of acetone and a solution of 4 g. of sodium hydroxide in 6 cc. of water are added to 24.5 g. of 4-isopropyl-3-nitro benzene sulfonamide of the melting point 105–107° C. Said sulfonamide was obtained by reacting 2-nitro isopropyl benzene with chloro sulfonic acid and converting the resulting 4-isopropyl-3-nitro benzene sulfochloride with ammonia into the acid amide. 12 g. of butyl isocyanate are added to the reaction mixture while stirring and cooling with ice. Stirring is continued at room temperature until the odor of the isocyanate has disappeared. The resulting solution is filtered, the filtrate is evaporated to dryness, and the residue is dissolved in water with the addition of a small amount of dilute ammonia. The solution is decolorized by the addition of a decolorizing carbon, filtered, and acidified by the addition of hydrochloric acid. The resulting crude $N_1$-(4-isopropyl-3-nitro benzene sulfonyl)-$N_2$-butyl urea is filtered off by suction and dried. It melts at 150–153° C.

It is catalytically reduced at room temperature by means of Raney nickel as described in the preceding examples. The resulting $N_1$-(4-isopropyl-3-amino benzene sulfonyl)-$N_2$-butyl urea has the melting point 105–107° C.

The following sulfonyl urea compounds are prepared in an analogous manner:

EXAMPLES 36

By using 4-methyl-3-nitrobenzene sulfonamide and benzyl isocyanate: $N_1$-(4-methyl-3-amino benzene sulfonyl)-$N_2$-benzyl urea of the melting point 150–152° C.

EXAMPLE 37

By using 4-methyl-3-amino benzene sulfonamide and β-phenyl ethyl isocyanate: $N_1$-(4-methyl-3-amino benzene sulfonyl)-$N_2$-(β-phenyl ethyl)urea of the melting point 138–140° C.

EXAMPLE 38

By using 4-methyl-3-nitro benzene sulfonamide and furfuryl isocyanate: $N_1$-(4-methyl-3-amino benzene sulfonyl)-$N_2$-furfuryl urea of the melting point 157–159° C.

EXAMPLE 39

By using 4-methyl-3-nitro benzene sulfonamide and α,α,γ,γ-tetramethyl butyl isocyanate: $N_1$-(4-methyl-3-amino benzene sulfonyl)-$N_2$-(α,α,γ,γ-tetramethyl butyl) urea of the melting point 137–139° C.

As stated hereinabove, the new amino benzene sulfonyl urea compounds have proved to be orally highly effective agents useful in the treatment of diabetes. While the preferred dose is between about 50 mg. and about 100 mg. and the initial dose at the beginning of the treatment is about between 75 mg. and about 150 mg., said compounds have also been effective in a dose of 25 mg. per day in the treatment of at least some patients. A minimum dose of 50 mg. per day, however, is usually required to produce the desired blood sugar level.

With a daily dose between about 50 mg. and about 150 mg. and with a preferred daily dose between about 50 mg. and about 100 mg. no toxic effects were observed.

Preferably, the new amino benzene sulfonyl urea compounds according to the present invention are administered perorally in mixture with a pharmeceutical carrier in the form of tablets, pills, lozenges, dragees, and the like shaped and/or compressed preparations. It is also possible to produce emulsions or suspensions of said compounds in water or aqueous media such as unsweetened fruit juices and by means of suitable emulsifying or dispersing agents. The new anti-diabetic agents may furthermore be employed in the form of powders filled into gelatin capsules or the like.

Such powders and mixtures to be used in the preparation of tablets and other shaped and/or compressed preparations may be diluted by mixing and milling with a solid pulverulent extending agent to the desired degree of fineness or by impregnating the already milled, finely powdered, solid carrier with a suspension of the new amino benzene sulfonyl urea compounds in water or with a solution thereof in an organic solvent, such as ethanol, methanol, acetone, and others, and then removing the water or solvent.

When preparing tablets, pills, dragees, and the like shaped and/or compressed preparations, the commonly used diluting, binding, and disintegrating agents, lubricants, and other tableting adjuvants are employed, provided they are compatible with the new amino benzene sulfonyl urea compounds. Such diluting agents and other excipients are, for instance, sugar, lactose, levulose, starch, bolus alba, as disintegrating and binding agents gelatin, gum arabic, yeast extract, agar, tragacanth, methyl celluose, pectin, and as lubricants stearic acid, talc, magnesium stearate, and others.

It is, of course, also possible to administer the new amino benzene sulfonyl urea compounds in the form of suppositories whereby the commonly used suppository vehicles, such as cocoa butter are used.

The amounts of the new amino benzene sulfonyl urea compounds in antidiabetic pharmaceutical unit dosage form according to the present invention may be varied. It is also possible to administer several unit dosage forms at the same time. Since a daily dose of 25 mg. is the minimum dose to be administered, it is advisable that not less than about 1% and preferably not less than about 5% of the new amino benzene sulfonyl urea compounds be present in compositions according to the present invention. It is, however, advantageous to prepare tablets and the like shaped and/or compressed preparations with a minor proportion of diluent and tableting adjuvants and a major proportion of the new amino benzene sulfonyl urea compounds. Tablets containing from 25 mg. to 50 mg. of said compound are particularly useful in administering the required dose.

The following examples of compositions containing the new amino benzene sulfonyl urea compounds as they are to be used in diabetes therapy serve to illustrate the present invention without, however, limiting the same thereto.

EXAMPLE 40

0.18 kg. of $N_1$-(3-amino-4-methyl benzene sulfonyl)-$N_2$-cyclohexyl urea are moistened with 3,500 cc. of a 1% gelatin solution and are kneaded in a kneader until its initial crystal structure has disappeared. The resulting mixture is granulated and is dried in an air current at about 40° C. 0.530 kg. of granulate are obtained thereby. The granulate is intimately mixed, in a mixing apparatus, with 1,550 g. of corn starch and 100 g. of magnesium stearate and compressed by means of a revolving tabletting press to tablets having a diameter of 13 mm. and a weight of 0.6 g. Each tablet contains about 0.05 g. of $N_1$-(3-amino-4-methyl benzene sulfonyl)-$N_2$-cyclohexyl urea.

EXAMPLE 41

Cores of dragees with convex surfaces composed of 0.025 g. of $N_1$-(3-amino-4-methyl benzene sulfonyl)-$N_2$-(bicyclo-[2,2,1]-heptyl-(2)-methyl) urea and of 0.0325 g. of potato starch containing 10% of stearic acid are prepared by compressing such a mixture. Said cores are coated in a dragee coating vessel by means of sugar sirup and talcum. The last dragee coating contains aromatic, sweetening, and coloring agents and is polished and, if desired, provided with a thin metal foil layer.

EXAMPLE 42

0.025 g. of pulverized pure $N_1$-(4-methyl-3-amino benzene sulfonyl)-$N_2$-4-methyl cyclohexyl urea are filled into one half of a gelatin capsule and the other half of said capsule is fit thereover. Both halves are then united and sealed to form a gelatin capsule.

EXAMPLE 43

10 kg. of $N_1$-(3-amino-4-methyl benzene sulfonyl)-$N_2$-($\Delta_5$-bicyclo-[2,2,1]-heptenyl-(2)-methyl) urea are finely pulverized and are mixed in a kneading device with a vegetable or suitable mineral oil in an amount sufficient to produce a suspension which is fluid and can be ejected through a canula. Said suspension is injected, by means of a suitable machine, in a predetermined dosage between two plastic gelatin foils and the foils are seamlessly welded with each other. The resulting capsule is completely filled with $N_1$-(3-amino-4-methyl benzene sulfonyl)-$N_2$-($\Delta_5$-bicyclo-[2,2,1]-heptenyl-2-methyl)urea, for instance, in an amount of 0.030 g. per capsule. The foils or the oil can be dyed, rendered opaque, or can otherwise be rendered distinctive.

EXAMPLE 44

0.3 kg. of $N_1$-(3-amino-4-methyl benzene sulfonyl)-$N_2$-(bicyclo-[2,2,1]-heptyl-2)urea are mixed in a kneader with 2.5 kg. of starch and 1.38 kg. of lactose. This mixture is then further kneaded with a mucilage made from 4 l. of water and 120 g. of gum tragacanth. The resultant moist material is passed through an extrusion press and then through a pill-making machine which gives moist pills weighing 0.18 g.

After removal of the moisture in a drier the pills weigh 0.14 g. and have an active material content of 0.01 g.

Instead of gum tragacanth one can employ other binding material such as methyl cellulose, gum arabic, or magnesium aluminum silicate (Veegum, Vanderbilt, New York, 17). It is also possible, by employing different rollers in the pill-making machine, to produce pills with a larger active material content.

EXAMPLE 45

A 1% suspension of finely pulverized $N_1$-(3-amino-4-methyl benzene sulfonyl)-$N_2$-(cycloheptyl) urea in an aqueous 20% sugar solution is prepared. The sugar solution contains methyl cellulose in an amount sufficient to produce a viscous suspension. Aromatic substances such as oil of cinnamon, aniseed oil, vanillin, or vanilla extract and, if desired, dyestuffs, are added thereto. The suspension is filled into bottles or tubes. 10 cc. thereof contain about 0.1 g. of $N_1$-(3-amino-4-methyl benzene sulfonyl)-$N_2$-(cycloheptyl)urea.

In place of a 20% sugar solution there can be used a 50% levulose solution whereby the amount of $N_1$-(3-amino-4-methyl benzene sulfonyl)-$N_2$-(cycloheptyl) urea in the resulting suspension can be increased to 1.5%. It is, of course, also possible to prepare suspensions of this type which contain only 0.5% of $N_1$-(3-amino-4-methyl benzene sulfonyl)-$N_2$-(cycloheptyl) urea. The sugar may be completely omitted and/or in its place there may be used suitable fruit juices such as orange, grapefruit, tomato juice, or the like. As a thickening agent there may be used a suitable magnesium aluminum silicate instead of methyl cellulose.

EXAMPLE 46

Finely pulverized $N_1$-(3-amino-4-methyl benzene sulfonyl)-$N_2$-(n-butyl) urea is intimately mixed with a molten suppository vehicle of a fatty ester or polyethylene glycol base. The mixture is poured into a suppository mold. The resulting suppositories contain about 0.1 g. of $N_1$-(3-amino-4-methyl benzene sulfonyl)-$N_2$-(n-butyl) urea.

The preferred and more effective compounds according to the present invention are the $N_1$-(3-amino-4-methyl benzene sulfonyl) urea compounds substituted at the $N_2$-atom by a saturated or unsaturated cycloaliphatic radical and especially the $N_1$-(3-amino-4-methyl benzene sulfonyl)-$N_2$-cyclohexyl urea and the $N_1$-(3-amino-4-methyl benzene sulfonyl)-$N_2$-(4-methyl cyclohexyl)urea.

The following pharmacological tests were carried out with the $N_1$-(3-amino-4-methyl benzene sulfonyl)-$N_2$-cyclohexyl urea. These tests prove the superiority of said compound over known orally effective antidiabetic sulfonamides. The following properties were determined:

(a) The activity of the compound in animal experiments whereby the smallest effective dose was determined.
(b) The persistence, i.e., duration of the antidiabetic effect measured by determining the period of time for which the tested substance remains and can be detected in human serum. The half-life period of the serum level was used as measuring value.

The following table gives these values, i.e., smallest effective dose and half-life period as well as the product of said values, whereby the activity of compound 1 is taken as standard value=1.

TABLE

| | Compound | Relative activity | Half-life period in hours | Product of relative activity and half-life period |
|---|---|---|---|---|
| 1 | Sulfanilyl butyl urea | 1.0 | 44 | 44 |
| 2 | p-Toluene sulfonyl butyl urea | 12.0 | 8 | 96 |
| 3 | p-Chloro benzene sulfonyl urea | 12.5 | 13 | 162.5 |
| 4 | Sulfanilyl isoamyl urea | 1.2 | 50 | 75 |
| 5 | $N_1$-(3-amino-4-methyl benzene sulfonyl)-$N_2$-cyclohexyl urea | 40.0 | 25 | 1000 |
| 6 | $N_1$-(3-amino-4-methyl benzene sulfonyl)-$N_2$-cyclopentyl urea | 20.0 | 42 | 840 |

The product of relative activity and duration of action serves as comparative measuring value for the clinical utility of a drug; for, as is known, highly effective compounds with a low half-life period are therapeutically as effective as compounds of lower activity with a prolonged half-life period.

As is shown by the above given table, the $N_1$-(3-amino-4-methyl benzene sulfonyl)-$N_2$-cyclohexyl urea has not only a high relative antidiabetic activity which is about 40 times greater than the activity of the known oral antidiabetic agent sulfanilyl butyl urea, but it exhibits also a comparatively prolonged half-life period which exceeds that of p-toluene sulfonyl butyl urea, another well known oral antidiabetic agent by about 300%.

The $N_1$-(3-amino-4-methyl benzene sulfonyl)-$N_2$(4-methyl cyclohexyl) urea has proved to exert an especially high blood sugar-lowering effect and has the further advantage that a substantially non-toxic degradation product is obtained because the p-methyl group in the cyclohexyl radical is completely oxidized to a carboxyl group. The resulting degradation product is readily soluble and thus is readily and rapidly excreted. The corresponding cyclohexyl compounds having a methyl group in o- or m-position are not as easily oxidized and, therefore, not as readily excreted.

We claim:

1. $N_1$-(3-amino-4-methyl benzene sulfonyl)-$N_2$-(bicyclo-[2,2,1]-heptyl-2) urea.

2. $N_1$-(3-amino - 4 - methyl benzene sulfonyl)-$N_2$-(bicyclo-[2,2,1]-heptyl-(2)-methyl) urea.

3. $N_1$-(3-amino-4-methyl benzene sulfonyl)-$N_2$-($\Delta_5$-bicyclo-[2,2,1]-heptenyl-(2)-methyl) urea.

References Cited by the Examiner

UNITED STATES PATENTS

| 2,371,178 | 3/45 | Martin et al. | 260—553 |
| 2,849,369 | 8/58 | Muset | 167—65 |
| 2,888,380 | 5/59 | Brown et al. | 167—65 |
| 2,928,871 | 3/60 | Aeschlemann et al. | 260—553 |
| 2,964,560 | 12/60 | Haack et al. | 260—553 |
| 2,968,158 | 1/61 | Ruschig et al. | 260—553 |
| 2,977,375 | 3/61 | Haack et al. | 260—553 |
| 3,015,673 | 1/62 | Zahler | 260—553 |
| 3,096,356 | 7/63 | Jirou et al. | |

WALTER A. MODANCE, *Primary Examiner.*

IRVING MARCUS, *Examiner.*